US012397248B2

(12) United States Patent
Sherwood (10) Patent No.: US 12,397,248 B2
(45) Date of Patent: *Aug. 26, 2025

(54) FILTRATION SYSTEM FOR A WATER DRAINAGE SYSTEM

(71) Applicant: Robert Sherwood, Almont, MI (US)

(72) Inventor: Robert Sherwood, Almont, MI (US)

( * ) Notice: Subject to any disclaimer, the term of this patent is extended or adjusted under 35 U.S.C. 154(b) by 142 days.

This patent is subject to a terminal disclaimer.

(21) Appl. No.: 17/897,892

(22) Filed: Aug. 29, 2022

(65) Prior Publication Data

US 2023/0302385 A1    Sep. 28, 2023

Related U.S. Application Data

(63) Continuation-in-part of application No. 17/704,439, filed on Mar. 25, 2022, now Pat. No. 11,471,796.

(51) Int. Cl.
*B01D 35/02* (2006.01)
*B01D 35/30* (2006.01)
*E04D 13/08* (2006.01)

(52) U.S. Cl.
CPC ............ *B01D 35/02* (2013.01); *B01D 35/30* (2013.01); *E04D 13/08* (2013.01); *E04D 2013/086* (2013.01)

(58) Field of Classification Search
None
See application file for complete search history.

(56) References Cited

U.S. PATENT DOCUMENTS

| | | | | |
|---|---|---|---|---|
| 60,005 A * | 11/1866 | Hicks et al. | ............ | E04D 13/08 137/873 |
| 94,271 A * | 8/1869 | Ayres | ...................... | E04D 13/08 137/873 |
| 97,160 A * | 11/1869 | Burleigh | ................ | B01D 29/05 210/247 |
| 174,227 A * | 2/1876 | Gill | ........................ | B01D 35/02 210/433.1 |
| 246,930 A * | 9/1881 | West | ........................ | E03B 3/02 137/873 |
| 289,473 A * | 12/1883 | Van Tassel | ............. | B01D 35/02 210/447 |
| 334,386 A * | 1/1886 | Hough et al. | .......... | B01D 27/06 251/118 |
| 371,697 A * | 10/1887 | Miller | ...................... | E03B 3/02 210/495 |
| 381,990 A * | 5/1888 | Driller | .................... | E04D 13/08 210/446 |
| 458,768 A * | 9/1891 | Weightman | ............. | E04D 13/08 137/873 |
| 522,667 A * | 7/1894 | Minnemyer | ........... | B01D 35/02 210/447 |

(Continued)

*Primary Examiner* — Robert J Popovics
(74) *Attorney, Agent, or Firm* — Brooks Kushman P.C.

(57) ABSTRACT

A downspout drain filter includes a housing and a filter media. The housing defines an internal cavity, an inlet to the internal cavity along a top of the housing, and an outlet from the internal cavity along a bottom of the housing. The filter media is disposed within the internal cavity. The filter media divides the internal cavity into an upper chamber and a lower chamber. The filter media is configured to trap debris in the upper chamber from fluid flowing downward through the internal cavity. The filter media is permeable such that the fluid flows from the upper chamber to the lower chamber.

14 Claims, 9 Drawing Sheets

(56) References Cited

U.S. PATENT DOCUMENTS

| | | | | |
|---|---|---|---|---|
| 527,400 A * | 10/1894 | Barth | E03B 3/02 | 137/873 |
| 541,183 A * | 6/1895 | Schermehorn | B01D 35/02 | 210/447 |
| 542,934 A * | 7/1895 | Kleespies | E03B 3/02 | 137/583 |
| 543,922 A * | 8/1895 | Buckley | B01D 35/30 | 210/314 |
| 571,776 A * | 11/1896 | Long | E04D 13/08 | 210/405 |
| 581,740 A * | 5/1897 | Kolthoff | B01D 17/045 | 210/317 |
| 608,765 A * | 8/1898 | Epple | E04D 13/08 | 251/215 |
| 617,032 A * | 1/1899 | Martin | B01D 35/02 | 210/451 |
| 677,773 A * | 7/1901 | Burbridge | B01D 17/045 | 210/447 |
| 694,440 A * | 3/1902 | Stair | B01D 35/30 | 210/451 |
| 752,547 A * | 2/1904 | Harris et al. | B01D 35/147 | 210/411 |
| 863,092 A * | 8/1907 | Renn | B01D 24/12 | 210/317 |
| 896,202 A * | 8/1908 | Easley et al. | B01D 29/11 | 210/317 |
| 896,574 A * | 8/1908 | Ray | B01D 29/03 | 210/317 |
| 899,568 A * | 9/1908 | Shephard | B01D 29/111 | 210/163 |
| 971,578 A * | 10/1910 | Walker | E03B 3/02 | 210/317 |
| 1,033,329 A * | 7/1912 | Laughlin | B01D 29/15 | 210/433.1 |
| 1,044,601 A * | 11/1912 | Thiem | B01D 35/02 | 210/489 |
| 1,075,576 A * | 10/1913 | Kadow | B01D 35/005 | 210/451 |
| 1,076,075 A * | 10/1913 | Steele | B01D 35/02 | 210/447 |
| 1,136,538 A * | 4/1915 | Kuenzli | B01D 35/02 | 210/433.1 |
| 1,177,174 A * | 3/1916 | Doty | B01D 35/147 | 210/317 |
| 1,188,280 A * | 6/1916 | Kuenzli | B01D 35/02 | 210/433.1 |
| 1,211,052 A * | 1/1917 | Bernard | B01D 35/30 | 210/433.1 |
| 1,231,356 A * | 6/1917 | Houge | B04B 11/04 | 4/DIG. 14 |
| 1,254,125 A * | 1/1918 | Dash | B01D 35/02 | 210/433.1 |
| 1,260,277 A * | 3/1918 | Ranney | B01D 29/23 | 210/317 |
| 1,265,772 A * | 5/1918 | Groo | B60T 17/006 | 210/209 |
| 1,270,274 A * | 6/1918 | Dunn | B01D 36/001 | 210/451 |
| 1,283,278 A * | 10/1918 | Ott | B01D 29/90 | 210/433.1 |
| 1,383,547 A * | 7/1921 | Konsalik | E04D 13/08 | 210/314 |
| 1,532,013 A * | 3/1925 | Winans | B01D 24/22 | 210/447 |
| 1,552,902 A * | 9/1925 | Werner | F16L 55/24 | 210/446 |
| 1,559,941 A * | 11/1925 | Demaree | E03B 3/03 | 210/422 |
| 1,653,473 A * | 12/1927 | Schulz | B01D 35/28 | 210/433.1 |
| 1,892,039 A * | 12/1932 | Demaree | B01D 35/28 | 210/433.1 |
| 2,090,997 A * | 8/1937 | French | E04D 13/08 | 210/433.1 |
| 2,419,501 A * | 4/1947 | Pinto | E04D 13/08 | 210/446 |
| 2,463,814 A * | 3/1949 | Skinner | D21F 1/66 | 210/232 |
| 2,494,780 A * | 1/1950 | Schmidt | E04D 13/0645 | 210/162 |
| 2,532,388 A * | 12/1950 | Batt, Jr. | E04D 13/08 | 210/447 |
| 2,887,073 A * | 5/1959 | Thompson | E04D 13/08 | 52/12 |
| 3,421,629 A * | 1/1969 | Hehr | E04D 13/08 | 210/477 |
| 3,426,866 A * | 2/1969 | Jensen | F16L 55/033 | 239/553.3 |
| 3,465,885 A * | 9/1969 | Trump | E04D 13/08 | 210/447 |
| 3,556,298 A * | 1/1971 | Huebner | B01D 35/147 | 210/493.1 |
| 3,628,668 A * | 12/1971 | Huppert | E04D 13/08 | 52/12 |
| 3,896,005 A * | 7/1975 | Zuccolotto | B01D 35/18 | 202/185.1 |
| 3,956,133 A * | 5/1976 | Arnold | E04D 13/08 | 210/232 |
| 3,990,474 A * | 11/1976 | Harms | E04D 13/08 | 52/16 |
| 4,120,790 A * | 10/1978 | Tinker | B01D 35/28 | 209/267 |
| 4,173,361 A * | 11/1979 | Gagas | F16L 25/14 | 285/424 |
| D260,422 S | 8/1981 | Husted | | |
| 4,301,011 A * | 11/1981 | Stamm | B01D 35/02 | 210/447 |
| 4,460,469 A * | 7/1984 | Francesconi, Jr. | B01D 35/02 | 210/470 |
| 4,470,908 A * | 9/1984 | Odekirk | B01D 35/00 | 210/463 |
| 4,472,274 A * | 9/1984 | Williams | B01D 29/945 | D23/209 |
| 4,523,875 A * | 6/1985 | DiFiore | E03F 1/002 | 52/12 |
| 4,615,153 A * | 10/1986 | Carey | E04D 13/08 | 52/12 |
| D288,840 S * | 3/1987 | Williams | D23/261 | |
| 4,798,028 A * | 1/1989 | Pinion | E04D 13/08 | 52/16 |
| 4,801,377 A * | 1/1989 | Bolt | B01D 29/945 | 52/12 |
| 5,114,594 A * | 5/1992 | Rosebrock | E04D 13/08 | 52/12 |
| 5,119,849 A * | 6/1992 | Hinkley | E04D 13/08 | 134/201 |
| 5,230,798 A * | 7/1993 | Rogman | B01D 29/96 | 52/12 |
| D354,552 S * | 1/1995 | Weber | D23/261 | |
| 5,452,546 A * | 9/1995 | Goddard | E04D 13/08 | 210/170.03 |
| 5,526,612 A * | 6/1996 | Wade | E04D 13/0645 | 52/12 |
| 5,533,303 A * | 7/1996 | Harvey | E03B 3/02 | 52/16 |
| 5,681,455 A * | 10/1997 | Takai | E03B 3/02 | 210/170.03 |
| 5,709,051 A * | 1/1998 | Mazziotti | E04D 13/08 | 52/12 |
| 5,863,151 A * | 1/1999 | Chapotelle | E03B 3/02 | 210/170.03 |
| 5,882,508 A * | 3/1999 | St-Jacques | E03F 1/002 | 210/170.03 |
| 5,985,158 A * | 11/1999 | Tiderington | B01D 29/35 | 52/12 |
| 6,024,127 A * | 2/2000 | Johnson | E04D 13/08 | 52/16 |

(56) References Cited

U.S. PATENT DOCUMENTS

| | | | | |
|---|---|---|---|---|
| 6,115,970 A | * | 9/2000 | Wilczynski | E04D 13/08 52/12 |
| 6,219,972 B1 | * | 4/2001 | Zusy | E04D 13/076 52/12 |
| 6,263,618 B1 | * | 7/2001 | Jones | E04D 13/0767 52/12 |
| 6,619,312 B2 | | 9/2003 | Doiron | E03B 3/02 137/122 |
| 6,705,049 B2 | * | 3/2004 | Esmond | E04D 13/08 210/162 |
| 6,936,164 B2 | * | 8/2005 | Wade | B01D 33/466 52/12 |
| 7,141,158 B2 | * | 11/2006 | Hong | E04D 13/0645 52/12 |
| D575,853 S | | 8/2008 | Adamson | |
| D589,127 S | * | 3/2009 | Cornwall | D23/268 |
| 7,550,077 B2 | * | 6/2009 | Graf | E04D 13/08 52/12 |
| 7,584,577 B2 | * | 9/2009 | Esmond | E04D 13/08 52/12 |
| D604,811 S | | 11/2009 | Barton | |
| D616,970 S | * | 6/2010 | Block | D23/267 |
| 7,805,890 B2 | * | 10/2010 | Esmond | E04D 13/08 52/12 |
| 7,870,868 B1 | * | 1/2011 | Ilalaole | E03D 5/003 4/395 |
| 7,919,002 B1 | * | 4/2011 | Hurtado | E04D 13/08 210/170.03 |
| 8,006,720 B1 | * | 8/2011 | Kotansky | E04D 13/08 52/16 |
| 8,033,058 B2 | * | 10/2011 | Block | E04D 13/08 52/12 |
| 8,136,304 B2 | * | 3/2012 | Sternbach | E04D 13/064 52/12 |
| 8,404,110 B2 | * | 3/2013 | Block | E04D 13/08 52/12 |
| 8,438,788 B2 | * | 5/2013 | Bell | E04D 13/08 52/12 |
| 8,475,654 B1 | * | 7/2013 | Smith | E04D 13/08 210/170.03 |
| 8,517,047 B2 | * | 8/2013 | Teoh | E04D 13/08 210/170.03 |
| 8,528,263 B2 | * | 9/2013 | Schmidt | E04D 13/08 52/16 |
| 8,656,947 B1 | * | 2/2014 | Barton | E04D 13/08 210/170.03 |
| 8,715,495 B1 | * | 5/2014 | Smith | E04D 13/0767 210/170.03 |
| D726,290 S | * | 4/2015 | Maurer | D23/267 |
| 9,038,320 B1 | * | 5/2015 | Deakins | E04D 13/08 52/12 |
| 9,080,328 B1 | * | 7/2015 | Smith | E04D 13/08 |
| 9,260,321 B2 | * | 2/2016 | Garios | E03B 1/041 |
| D761,397 S | | 7/2016 | Denooy | |
| 9,416,543 B1 | * | 8/2016 | Fox | E04D 13/0767 |
| D780,893 S | | 3/2017 | Denooy | |
| D790,043 S | | 6/2017 | Stout | |
| 9,732,526 B2 | * | 8/2017 | Denk | E04D 13/08 |
| 10,000,933 B2 | * | 6/2018 | Kerr | B01D 29/05 |
| 10,253,503 B2 | * | 4/2019 | Greenberg | E04D 13/076 |
| 10,435,875 B2 | * | 10/2019 | Kimberley | E03C 1/264 |
| 10,724,224 B2 | * | 7/2020 | Deurloo | B01D 29/27 |
| 11,117,076 B2 | * | 9/2021 | Neumann | B01D 39/10 |
| 11,332,918 B2 | * | 5/2022 | Deurloo | E03F 5/0404 |
| 11,471,796 B1 | * | 10/2022 | Sherwood | B01D 35/30 |
| 11,473,309 B1 | | 10/2022 | Cochran | |
| D973,850 S | | 12/2022 | Lin | |
| D975,825 S | | 1/2023 | Yin | |
| 11,607,631 B2 | * | 3/2023 | Neumann | E04D 13/08 |
| 11,619,038 B2 | * | 4/2023 | Sherwood | E03F 1/002 137/356 |
| 11,772,989 B2 | * | 10/2023 | Cochrane | C02F 1/001 210/170.03 |
| D1,018,793 S | * | 3/2024 | Sherwood | D23/267 |
| D1,018,798 S | | 3/2024 | Yin | |
| 12,060,285 B2 | * | 8/2024 | See | B01D 39/10 |
| D1,056,164 S | * | 12/2024 | Sherwood | D23/267 |
| 2001/0030149 A1 | * | 10/2001 | Naddy | E04D 13/0767 210/162 |
| 2003/0051414 A1 | * | 3/2003 | Bessette | E04D 13/08 52/16 |
| 2003/0167700 A1 | * | 9/2003 | Esmond | E04D 13/08 52/12 |
| 2004/0031209 A1 | * | 2/2004 | Porter | E04D 13/08 52/12 |
| 2005/0109693 A1 | * | 5/2005 | Allard | B01D 35/02 210/162 |
| 2005/0144852 A1 | * | 7/2005 | Hong | E04D 13/0767 52/12 |
| 2005/0246967 A1 | * | 11/2005 | Esmond | E04D 13/08 52/16 |
| 2008/0086953 A1 | * | 4/2008 | Graf | E04D 13/08 52/12 |
| 2008/0229673 A1 | * | 9/2008 | LaMorte | E04D 13/08 52/12 |
| 2009/0065072 A1 | * | 3/2009 | Adamson | E04D 13/08 137/357 |
| 2009/0236273 A1 | * | 9/2009 | Esmond | E04D 13/08 210/155 |
| 2010/0270219 A1 | * | 10/2010 | Block | E04D 13/08 210/162 |
| 2011/0041416 A1 | * | 2/2011 | Schmidt | E04D 13/08 52/16 |
| 2011/0100887 A1 | * | 5/2011 | Ballistreri | E04D 13/08 210/170.03 |
| 2011/0203191 A1 | * | 8/2011 | Argentina | E04D 13/0645 52/12 |
| 2011/0214360 A1 | * | 9/2011 | Sternbach | E04D 13/08 52/12 |
| 2011/0226350 A1 | * | 9/2011 | Russell | E04D 13/08 137/561 A |
| 2011/0232766 A1 | * | 9/2011 | Bell | E04D 13/08 52/16 |
| 2011/0290355 A1 | * | 12/2011 | Teoh | E03B 3/03 137/561 R |
| 2011/0303307 A1 | * | 12/2011 | Block | E04D 13/08 137/357 |
| 2012/0049511 A1 | * | 3/2012 | Bell | F16L 27/11 285/226 |
| 2012/0210652 A1 | * | 8/2012 | Seitz | E04D 13/08 52/12 |
| 2014/0054245 A1 | | 2/2014 | Loesche | |
| 2016/0017610 A1 | * | 1/2016 | Denk | E04D 13/08 210/170.03 |
| 2017/0211277 A1 | * | 7/2017 | Kerr | E03B 3/02 |
| 2019/0226193 A1 | * | 7/2019 | Deurloo | E03F 5/046 |
| 2020/0078711 A1 | * | 3/2020 | Neumann | C02F 1/001 |
| 2021/0024377 A1 | * | 1/2021 | Cochrane | E04D 13/08 |
| 2021/0095459 A1 | * | 4/2021 | Deurloo | E03F 5/042 |
| 2021/0340770 A1 | * | 11/2021 | Buhler | E04D 13/08 |
| 2021/0387115 A1 | * | 12/2021 | Neumann | C02F 1/001 |
| 2022/0145637 A1 | | 5/2022 | Gomez | |
| 2022/0402774 A1 | * | 12/2022 | See | E04D 13/08 |
| 2023/0031580 A1 | | 2/2023 | Neeb et al. | |
| 2023/0302385 A1 | * | 9/2023 | Sherwood | B01D 29/96 |
| 2023/0358050 A1 | * | 11/2023 | Sutton | E04D 13/08 |
| 2025/0092647 A1 | * | 3/2025 | Yang | E03B 3/03 |

* cited by examiner

FILTRATION SYSTEM FOR A WATER DRAINAGE SYSTEM

CROSS-REFERENCE TO RELATED APPLICATIONS

This application is a continuation-in-part of U.S. patent application Ser. No. 17/704,439 filed on Mar. 25, 2022, now U.S. Pat. No. 11,471,796, issued Oct. 18, 2022, the disclosure of which is hereby incorporated in its entirety by reference herein.

TECHNICAL FIELD

The present disclosure relates to water drainage systems, particularly to water drainage systems for buildings and houses.

BACKGROUND

Runoff water may be directed away from buildings and houses via water drainages systems

SUMMARY

A downspout drain filter includes a housing and a filter plate. The housing defines an internal cavity, an inlet to the internal cavity along a top of the housing, and an outlet from the internal cavity along a bottom of the housing. The filter plate is disposed within the internal cavity. The filter plate divides the internal cavity into an upper chamber and a lower chamber. The filter plate is configured to trap debris in the upper chamber from fluid flowing downward through the internal cavity. The filter plate is permeable such that the fluid flows from the upper chamber to the lower chamber. The filter plate has a removable central portion that provides access to the lower chamber from the upper chamber when removed.

A downspout drain filter includes a housing and a filter media. The housing defines an internal cavity, an inlet to the internal cavity along a top of the housing, and an outlet from the internal cavity along a bottom of the housing. The filter media is disposed within the internal cavity. The filter media divides the internal cavity into an upper chamber and a lower chamber. The filter media is configured to trap debris in the upper chamber from fluid flowing downward through the internal cavity. The filter media is permeable such that the fluid flows from the upper chamber to the lower chamber. The housing further defines an overflow opening along the top of the housing. The overflow opening is configured to direct the fluid out of the internal cavity in response to the filter media becoming clogged and the fluid filling the upper chamber.

A downspout drain filter includes a housing, The housing includes a top end, a bottom end, a front panel, a back panel, and a pair of opposing side panels, and at least one sloped surface. The front panel, back panel, and side panels collectively define an internal cavity. Each of the front, back, and side panels are disposed between the top end and the bottom end. The top end defines an inlet to the internal cavity. The bottom end defines an outlet from the internal cavity. The at least one sloped surface extends into the internal cavity such that the internal cavity tapers in a direction that extends from the top end to the bottom end of the housing along the at least one sloped surface.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
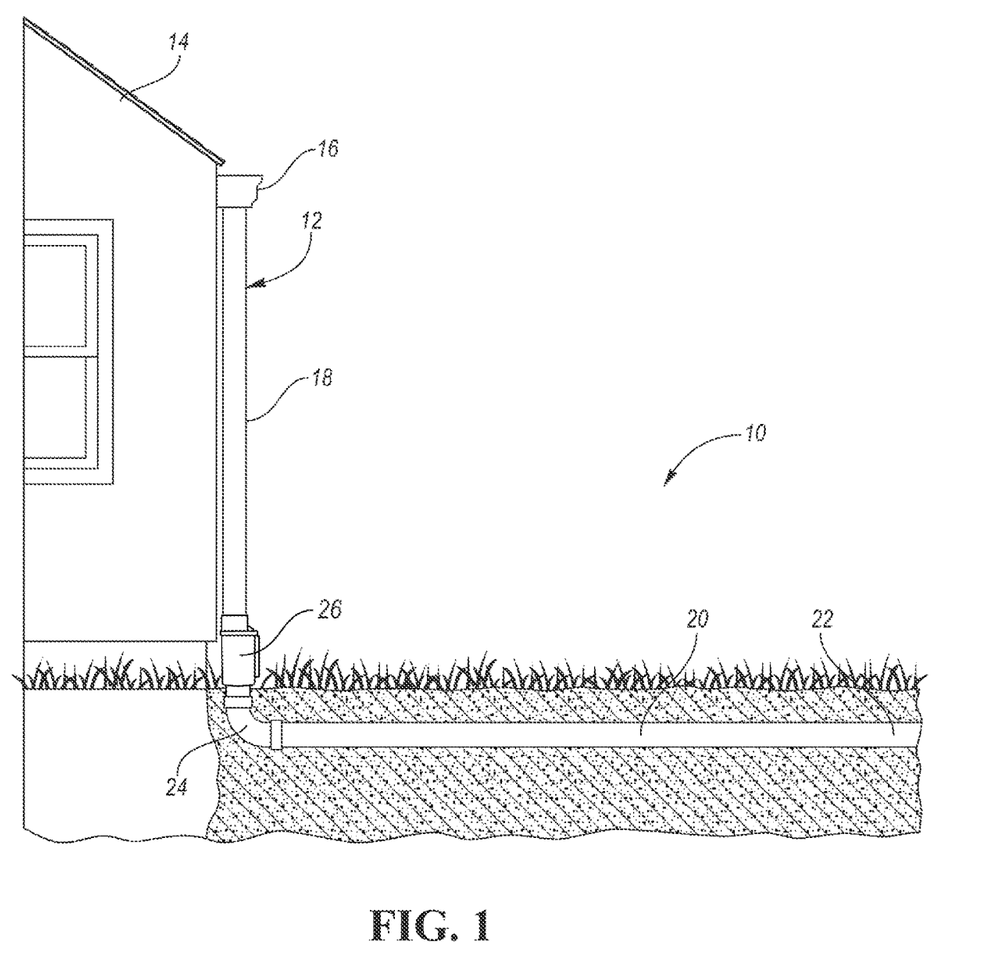
FIG. 1 is a front view of a water drainage systems for a building or house.

Referring to FIG. 1, a water drainage system 10 is illustrated. The water drainage system 10 may specifically be designed to direct fluid or water away from a house or building in order to prevent runoff water from the house or building from flooding the lower level (e.g., the basement) of the house or building. It should be understood, however, that the water drainage system 10 may be utilized in other scenarios and should not be construed as limited to a water drainage system that is configured to direct water away from a house or building.

As illustrated in FIG. 1, the water drainage system 10 includes tubes, pipes, or conduits 12 that are configured to direct water away from a house or building 14. More specifically, the conduits 12 may be configured to direct water away from a gutter or eavestrough 16 that is disposed along edges of a roof of the building 14. The eavestrough 16 is configured to collect runoff water that cascades down the roof of the building 14 during rainstorms, from melting snow, or from any other source. The conduits 12 are configured to direct the water away from the eavestrough 16 and away from the building 14. More specifically, the conduits 12 may be configured to direct the water toward a storm drain.

Catch basins of storm drains (i.e., the portions of storm drains that are the inlets to a storm drain system that are typically vertically oriented) are usually disposed along an edge of the pavement of a road or street and adjacent to a curb of the road or street. The pavement typically has a slight slope to direct the runoff water from the road or street into the catch basin. The curb may also be positioned above the catch basin and is sloped downward to direct runoff water from the ground that is adjacent to the catch basin toward the catch basin.

The tubes, pipes, or conduits 12 of the water drainage system 10 may include a downspout 18 that is configured to direct water downward from the eavestrough 16 to a drainage tube, pipe, or conduit 20. Stated in other terms, the downspout 18 establishes fluid communication between the eavestrough 16 and the drainage conduit 20. The drainage conduit 20 in turn may be configured to direct water from the downspout 18 to an outlet end 22 of the water drainage system 10. The drainage conduit 20 may include a slight downward slope extending in a direction from the downspout 18 to the outlet end 22 of the water drainage system 10 such that water flows from the downspout 18 to the outlet end 22 of the water drainage system 10. The drainage conduit 20 may include a bend that connects the drainage conduit 20 to the downspout 18. Alternatively, an elbow tube, pipe, or conduit 24 may connect the drainage conduit 20 to the downspout 18. The drainage conduit 20 and the first elbow conduit 24 may collectively be referred to as the drainage tube, pipe, or conduit.

The water drainage system 10 may include a filter 26 that is disposed between the downspout 18 and the drainage conduit 20. The filter 26 may be in fluid communication with both the downspout 18 and the drainage conduit 20. The filter 26 may also establish fluid communication between the downspout 18 and the drainage conduit 20. The filter 26 is configured to filter debris from fluid or water flowing from the downspout 18 to the drainage conduit 20. The filter 26 may be oriented vertically along or adjacent to the downspout 18, which may also be oriented vertically. In some scenarios, the filter 26 may divide the downspout 18 into an upper and a lower conduit. The filter 26 may be referred to as a downspout drain filter.

The drainage conduit 20 and the first elbow conduit 24 may be fully or partially disposed or buried underground, which may be for aesthetic purposes or may be to prevent placing an obstacle on an area of ground that may require maintenance (e.g., the area of ground may include grass that needs to be mowed on a regular basis) or that may have a significant amount of foot traffic. Alternatively, the drainage conduit 20 and the first elbow conduit 24 may be disposed above ground. The outlet end 22 of the water drainage system 10 may be connected directly to a storm drain or more specifically to a catch basin of a storm drain. Alternately, the outlet end 22 of the water drainage system 10 may include an opening that allows water to flow out of the water drainage system 10. Such an opening in the outlet end 22 may be positioned near an opening to a catch basin such that the water flowing out of the opening at the outlet end 22 is directed toward the opening to the catch basin.

As previously stated, the conduits 12 may be configured to direct water away from any source, and this disclosure should not be construed as limited to the layout of conduits 12 in FIG. 1. For example, the elbow conduit 24 is illustrated as a 90° elbow (i.e., an elbow pipe that is bent at about a 90° angle), but may be reconfigured as an elbow that is bent at any desirable angle (e.g., 60°, 45°, and 22.5°, etc.).

Figure 2:
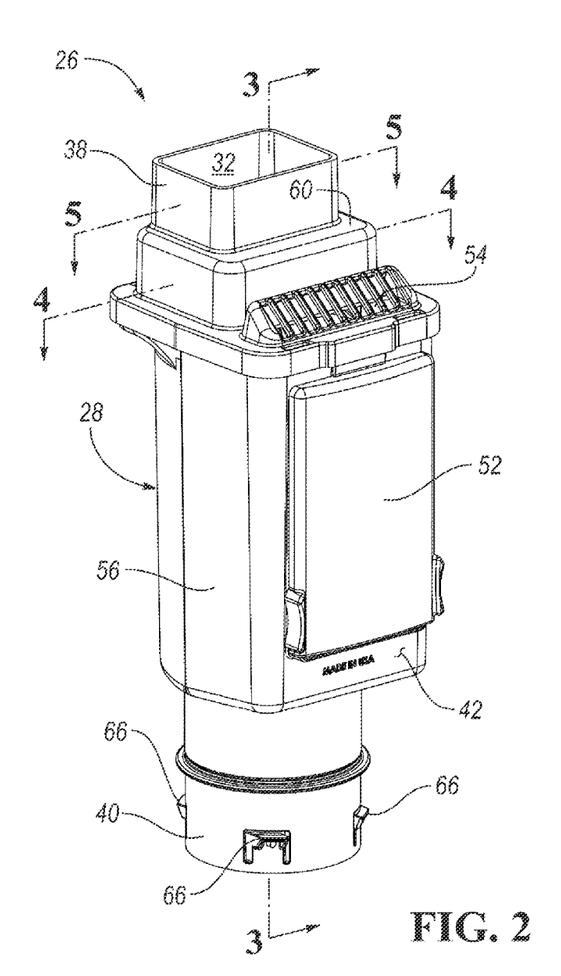
FIG. 2 is an isometric front view of a downspout drain filter for the water drainage system.
Figure 3:
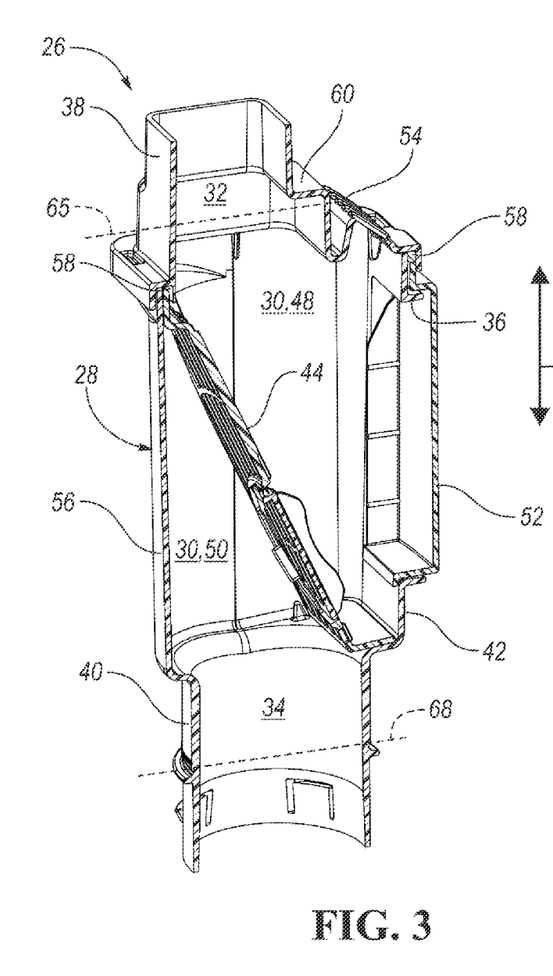
FIG. 3 is a cross-sectional view taken along line 3-3 in FIG. 2.
Figure 4:
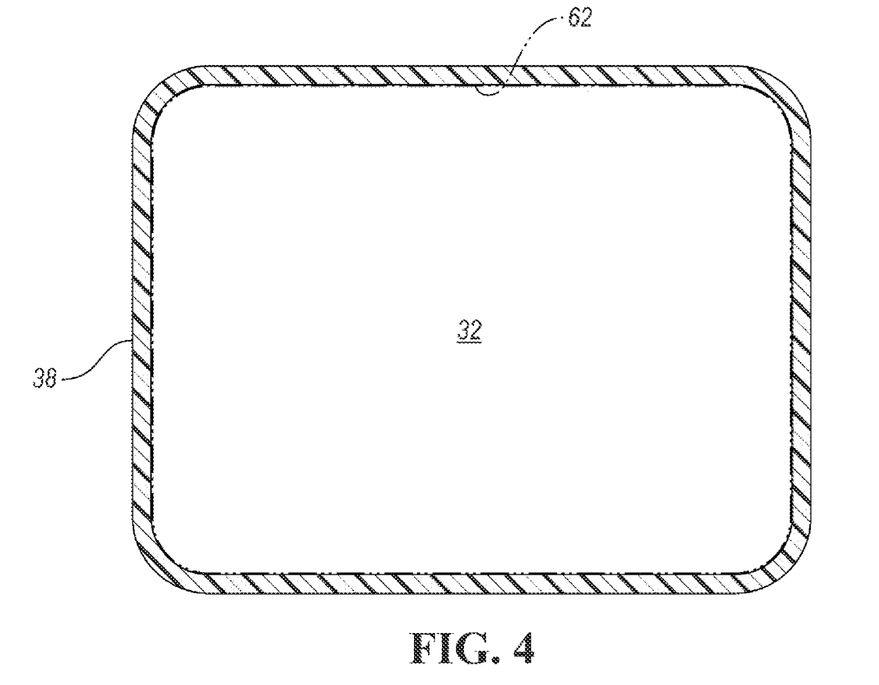
FIG. 4 is a cross-sectional view taken along line 4-4 in FIG. 2.
Figure 5:
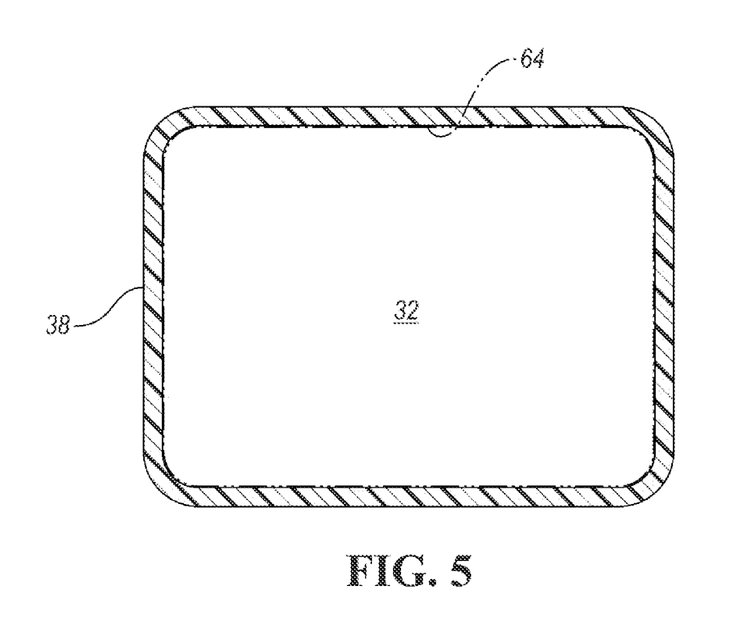
FIG. 5 is a cross-sectional view taken along line 5-5 in FIG. 2.

Referring to FIGS. 2-3, the filter 26 is illustrated is further detail. The filter 26 includes a housing 28. The housing defines an internal chamber or cavity 30, a first opening 32 to the internal cavity 30, a second opening 34 to the internal cavity 30, and a third opening 36 to the internal cavity 30. The first opening 32 to the internal cavity 30 is defined along a top or a top end 38 of the housing 28. The second opening 34 to the internal cavity 30 is defined along a bottom or a bottom end 40 of the housing 28. The third opening 36 to the internal cavity 30 is defined along front face 42 of the housing 28. The first opening 32 is an inlet to the internal cavity 30. The first opening 32 establishes fluid communication between the downspout 18 and the internal cavity 30. The second opening 34 is an outlet from the internal cavity 30. The second opening 34 establishes fluid communication between the internal cavity 30 and the drainage conduit 20.

A filter media or filter plate 44 is disposed within the internal cavity 30. The filter plate 44 may more specifically be a grated plate. The filter plate 44 may be disposed within the internal cavity 30 at an angle relative to a vertical direction 46. The filter plate 44 may divide the internal cavity 30 into an upper chamber 48 and a lower chamber 50. The filter plate 44 is configured to configured to trap debris, such as leaves, in the upper chamber 48 from fluid or water flowing downward through the internal cavity 30, while also being permeable such that the fluid or water flows through the filter plate 44 from the upper chamber 48 to the lower chamber 50.

A door or access panel 52 is secured to the housing 28 and over the third opening 36. The access panel 52 is configured to provide access to the upper chamber 48 for removal of debris trapped within the upper chamber 48. The housing 28 may further define an overflow opening 54 that is disposed above the access panel 52 along the top end 38 of the housing 28. The overflow opening 54 may be grated to prevent debris from entering into the internal cavity 30 via the overflow opening 54. If grated, the overflow opening 54 may more specifically comprise an array or a series of adjacent openings. The overflow opening 54 is configured to direct the fluid or water out of the internal cavity 30 in response to the filter plate 44 becoming clogged and fluid or water filling the upper chamber 48. The overflow opening 54 may be in direct fluid communication with the upper chamber 48.

The overflow opening 54 may be defined along the top of the upper chamber 48 so that under most conditions fluid or water will not flow out of the overflow opening but will flow downward via gravity through the filter plate 44 and out of the internal cavity 30 via the outlet or second opening 34. Only when the rate of fluid or water flowing into the upper chamber 48 via the inlet or first opening 32 exceeds the rate of fluid or water flowing through the filter plate 44 for a period of time, will the fluid or water flow out of the overflow opening 54. The fluid or water flowing out of the overflow opening 54 may then function as a signal that debris, such as leaves, has clogged the filter plate 44. Such a signal may act to notify an individual that is responsible for maintaining the filter 26 that debris needs to be removed from the internal cavity 30, or more specifically that debris needs to be removed from the upper chamber 48 of the internal cavity 30.

The overflow opening 54 may be positioned adjacent to and above the front face 42. The front face 42 and overflow opening 54 may be positioned to face outward from a building or house that the downspout 18 and filter 26 are secure to, so that is it easy to observe fluid or water flowing out of the overflow opening 54. The overflow opening 54 may also be orientated at an angle relative to the front face 42 of the housing 28, such that fluid or water flowing out the overflow opening 54 may be directed partially upward and partially outward from the filter 26. This further increases the ease of observing fluid or water flowing out of the overflow opening 54, since the fluid or water is being directed outward from the filter 26 and not simply downward where the fluid or water may trace along the outer surface of the filter 26 or any adjacent conduit that is disposed below the filter 26, which would be more difficult to observe particularly from a distance.

Referring now to FIGS. 2-5, the top end 38 and the bottom end 40 of the housing 28 are described in further detail. The top end 38 of the housing 28 may be a separate component from a remainder 56 of the housing 28. The top end 38 of the housing 28 may be secured to the remainder 56 of the housing 28 via fasteners, clips, snaps, etc. The top end 38 of the housing 28 and the remainder 56 of the housing 28 may also defines slots 58, that are configured to receive portions of the filter plate 44 and the access panel 52. The sections of the top end 38 of the housing 28 and the remainder 56 of the housing 28 that are adjacent to the slot 58 may function to trap the portions of the filter plate 44 and the access panel 52 within the slots 58 to retain the filter plate 44 and the access panel 52 in desired positions (e.g., the positions depicted in FIGS. 2-3). The filter plate 44 and the access panel 52 may be flexible so that the filter plate 44 and the access panel 52 may be manipulated into and out of the respective desired positions during installation onto or removal from the housing 28. The filter plate 44 and the access panel 52 may also be sufficiently rigid to remain in the respective desired positioned when no external force is applied.

The top end 38 of the housing 28 includes a step 60. A cross-sectional area of the first opening 32 is decreased from a first value 62 to a second value 64 along the step 60 and in a direction that extends away from the internal cavity 30. For example, the portion of the first opening 32 where the cross-sectional area is equal to the first value 62 may be sized to receive a four by three inch rectangular tube, conduit, or pipe, while the portion of the first opening 32 where the cross-sectional area is equal to the second value 64 may be sized to receive a three by two inch rectangular tube, conduit, or pipe. In the event the larger-sized connection (e.g., the portion of the top end 38 where the cross-sectional area of the first opening 32 is equal to the second value 64) is required for connecting the housing 28 to the downspout 18, the smaller-sized connection (e.g., the portion of the top end 38 where the cross-sectional area of the first opening 32 is equal to the first value 62) may be cut off from the remainder of the housing 28. For example, the portion of the top end 38 that includes the smaller-sized connection may be cut off from the remainder of the housing 28 by cutting the housing 28 along dashed line 65.

The bottom end 40 of the housing 28 may be sized for connecting to a circular tube, conduit, or pipe. The bottom end 40 of the housing 28 may include clips, snaps, or tabs 66 to connect to a corrugated tube, conduit, or pipe. In the event the bottom end 40 is to be connected to a non-corrugated tube, conduit, or pipe, a portion of the bottom end 40 that includes the clips, snaps, or tabs 66 may be cut off from the remainder of the housing 28. For example, the portion of the bottom end 40 that includes the clips, snaps, or tabs 66 may be cut off from the remainder of the housing 28 by cutting the housing 28 along dashed line 68.

Figure 6:
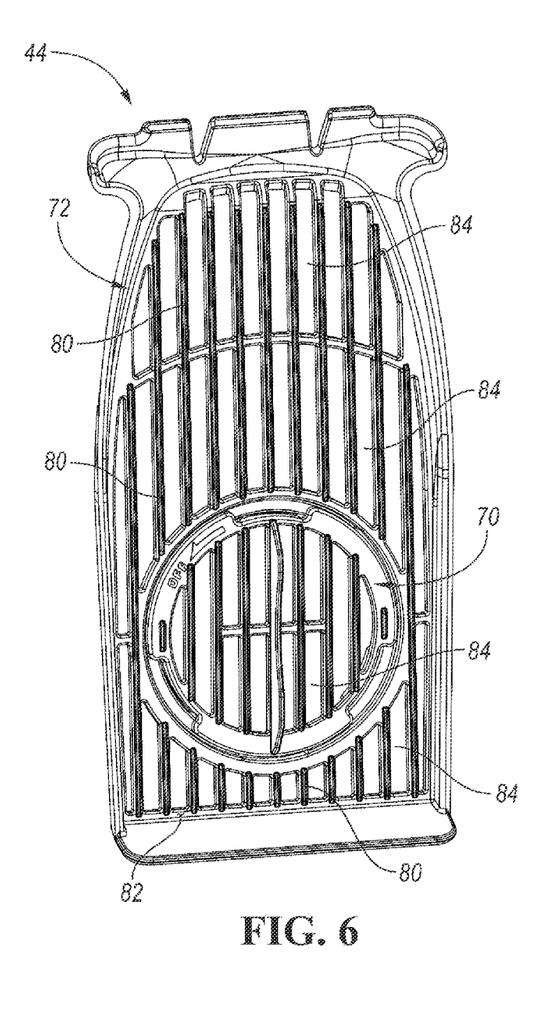
FIG. 6 is an isometric front view of a filter plate for the downspout drain filter in an assembled state.
Figure 7:
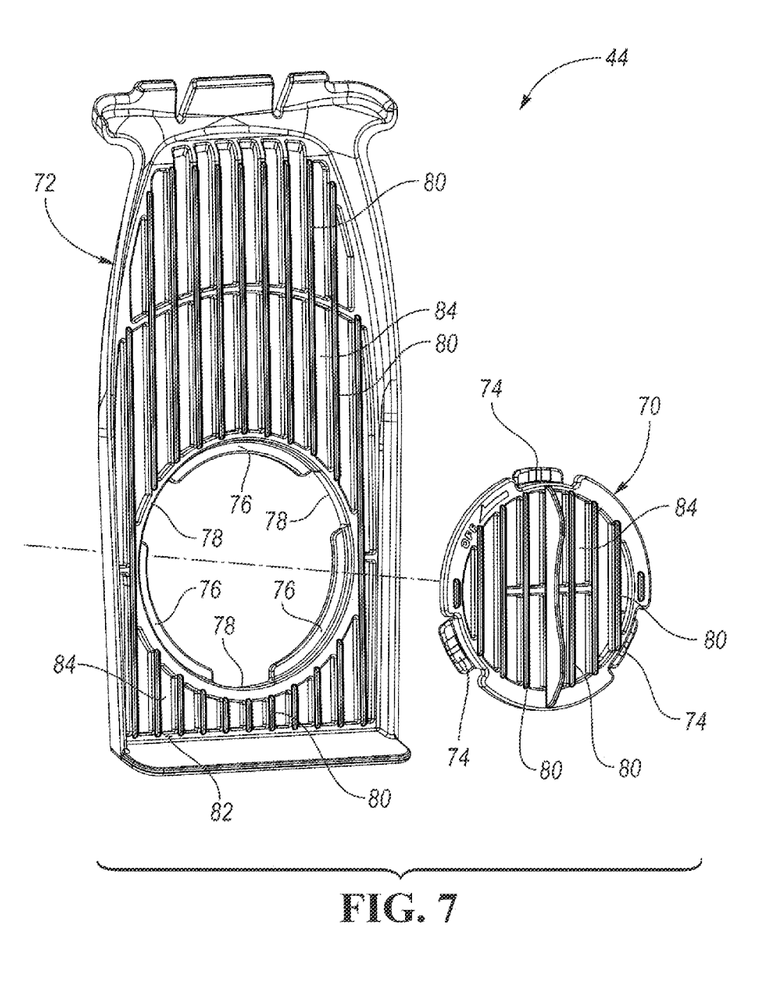
FIG. 7 is an exploded view of the filter plate in a disassembled state.

Referring now to FIGS. 3 and 6-7, the filter plate 44 is illustrated in further detail. The filter plate 44 includes a removable central portion 70 that provides access to the lower chamber 50 from the upper chamber 48 when removed. The removeable central portion 70 may be removed so that a hose, jet, heat cable, etc. may be placed into the drainage conduit 20 that is positioned below the bottom end 40 of the housing 28. A hose or jet may be used to clean out the drainage conduit 20. A heat cable may be used to prevent water from freezing within the drainage conduit 20, particularly during the winter months, which could cause damage to the conduit.

The removable central portion 70 of the filter plate 44 is configured to lock and unlock to and from a remainder 72 of the filter plate 44 via rotation relative the remainder 72 of the filter plate 44. The remainder 72 of the filter plate 44 may be referred to as the main portion of the filter plate 44. The removable central portion 70 of the filter plate 44 includes a first set of tabs 74. The remainder 72 of the filter plate includes a second set of tabs 76. The first set of tabs 74 are configured to align with the second tabs 76 to lock the removable central portion 70 of the filter plate 44 to the remainder 72 of the filter plate 44. The remainder 72 of the filter plate 44 defines slots 78. The first set of tabs 74 are configured to align with the slots 78 to unlock the removable central portion 70 of the filter plate 44 from the remainder 72 of the filter plate. The filter plate 44 may include ribs 80 that extending upward from an upper surface 82 of the filter plate 44. The ribs 80 are configured to separate debris from the upper surface 82 of the filter plate 44 to facilitate flow of fluid or water through the filter plate 44. More specifically, the ribs 80 are configured to lift the debris off of the upper surface 82 of the filter plate 44 so the openings 84 defined by the grating of the filter plate 44 are separated from the debris so that the fluid or water may flow through the openings 84.

Figure 8:
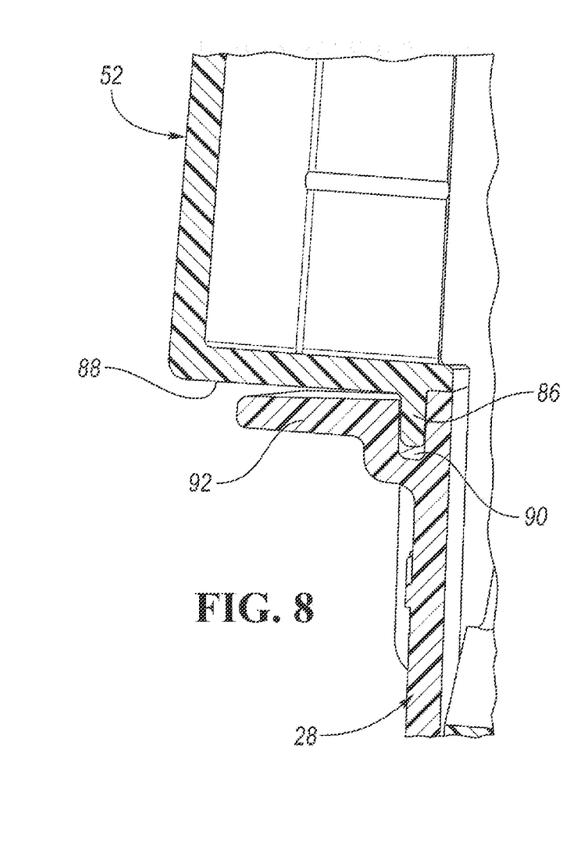
FIG. 8 is a cross-sectional view of an alternative engagement arrangement between the housing and access panel of downspout drain filter.

Referring to FIG. 8, a cross-sectional view of an alternative engagement arrangement between the housing 28 and the access panel 52 of the filter 26 is illustrated. The access panel 52 includes a protrusion 86 extending downward from a bottom end or bottom surface 88 of the access panel 52. The housing 28 defines a slot 90 along a ledge or shelf 92 upon which the access panel 52 is configured to rest when secured to the housing 28. The protrusion 86 is disposed within the slot 90 to further secure the access panel 52 to the housing 28.

Referring to FIGS. 9-15, an alternative embodiment of the filter 126 is illustrated. Unless otherwise stated herein, the filter 126 should be construed to include all of the same elements, structure, and functionally as filter 26 unless otherwise stated herein. The filter 126 includes a housing 128. The housing 128 defines an internal chamber or cavity 130, a first opening 132 to the internal cavity 130, a second opening 134 to the internal cavity 130, and a third opening 136 to the internal cavity 130. The first opening 132 to the internal cavity 130 is defined by or along a top or a top end 138 of the housing 128. The second opening 134 to the internal cavity 130 is defined by or along a bottom or a bottom end 140 of the housing 128. The third opening 136 to the internal cavity 130 is defined along front face 142 of the housing 128. The first opening 132 is an inlet to the internal cavity 130. The first opening 132 establishes fluid communication between the downspout 18 and the internal cavity 130 when the filter 126 is secured the downspout 18. The second opening 134 is an outlet from the internal cavity 130. The second opening 134 establishes fluid communication between the internal cavity 130 and the drainage conduit 20 when the filter 126 is secured the drainage conduit 20 via elbow conduit 24.

A filter media or filter plate 144 is disposed within the internal cavity 130. The filter plate 144 may more specifically be a grated plate. The filter plate 144 may be disposed within the internal cavity 130 at an angle relative to a vertical direction 146. The filter plate 144 may divide the internal cavity 130 into an upper chamber 148 and a lower chamber 150. The filter plate 144 is configured to trap debris, such as leaves, in the upper chamber 148 from fluid or water flowing downward through the internal cavity 130, while also being permeable such that the fluid or water flows through the filter plate 144 from the upper chamber 148 to the lower chamber 150.

A door or access panel 152 is secured to the housing 128 and over the third opening 136. The access panel 152 is configured to provide access to the upper chamber 148 for removal of debris trapped within the upper chamber 148. The housing 128 may further define an overflow opening 154 that is disposed above the access panel 152 along the top end 138 of the housing 128. The overflow opening 154 may be grated to prevent debris from entering into the internal cavity 130 via the overflow opening 154. If grated, the overflow opening 154 may more specifically comprise an array or a series of adjacent openings. The overflow opening 154 is configured to direct the fluid or water out of the internal cavity 130 in response to the filter plate 144 becoming clogged and fluid or water filling the upper chamber 148. The overflow opening 154 may be in direct fluid communication with the upper chamber 148.

The overflow opening 154 may be defined along the top of the upper chamber 148 so that under most conditions fluid or water will not flow out of the overflow opening 154 but will flow downward via gravity through the filter plate 144 and out of the internal cavity 130 via the outlet or second opening 134. Only when the rate of fluid or water flowing into the upper chamber 148 via the inlet or first opening 132 exceeds the rate of fluid or water flowing through the filter plate 144 for a period of time, will the fluid or water flow out of the overflow opening 154. The fluid or water flowing out of the overflow opening 154 may then function as a signal that debris, such as leaves, has clogged the filter plate 144. Such a signal may act to notify an individual that is responsible for maintaining the filter 126 that debris needs to be removed from the internal cavity 130, or more specifically that debris needs to be removed from the upper chamber 148 of the internal cavity 130.

The overflow opening 154 may be positioned adjacent to and above the front face 142. The front face 142 and overflow opening 154 may be positioned to face outward from a building or house that the downspout 18 and filter 126 are secure to, so that is it easy to observe fluid or water flowing out of the overflow opening 154. The overflow opening 154 may also be orientated at an angle relative to the front face 142 of the housing 128, such that fluid or water flowing out the overflow opening 154 may be directed partially upward and partially outward from the filter 126. This further increases the ease of observing fluid or water flowing out of the overflow opening 154, since the fluid or water is being directed outward from the filter 126 and not simply downward where the fluid or water may trace along the outer surface of the filter 126 or any adjacent conduit that is disposed below the filter 126, which would be more difficult to observe particularly from a distance.

The top end 138 of the housing 128 may be a separate component from a remainder 156 of the housing 128. The top end 138 of the housing 128 may be secured to the remainder 156 of the housing 128 via fasteners, clips, snaps, etc. The top end 138 of the housing 128 and the remainder 156 of the housing 128 may also define a slot 158, that is configured to receive a portion of the access panel 152. The sections of the top end 138 of the housing 128 and the remainder 156 of the housing 128 that are adjacent to the slot 158 may function to trap the portions of the access panel 152 within the slot 158 to retain the access panel 152 in a desired position (e.g., the position depicted in FIGS. 9 and 14-15). The filter plate 144 and the access panel 152 may be flexible so that the filter plate 144 and the access panel 152 may be manipulated into and out of the respective desired positions during installation onto or removal from the housing 128. The filter plate 144 and the access panel 152 may also be sufficiently rigid to remain in the respective desired positioned when no external force is applied.

Figure 9:
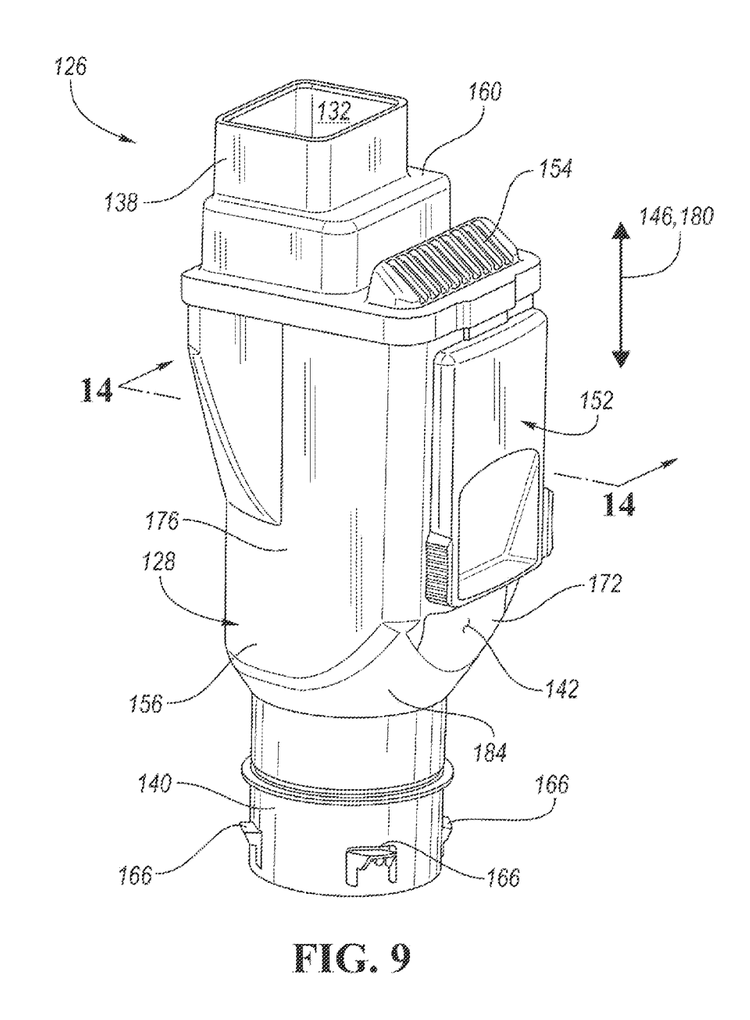
FIG. 9 is an isometric front view of an alternative embodiment of the downspout drain filter for the water drainage system.
Figure 10:
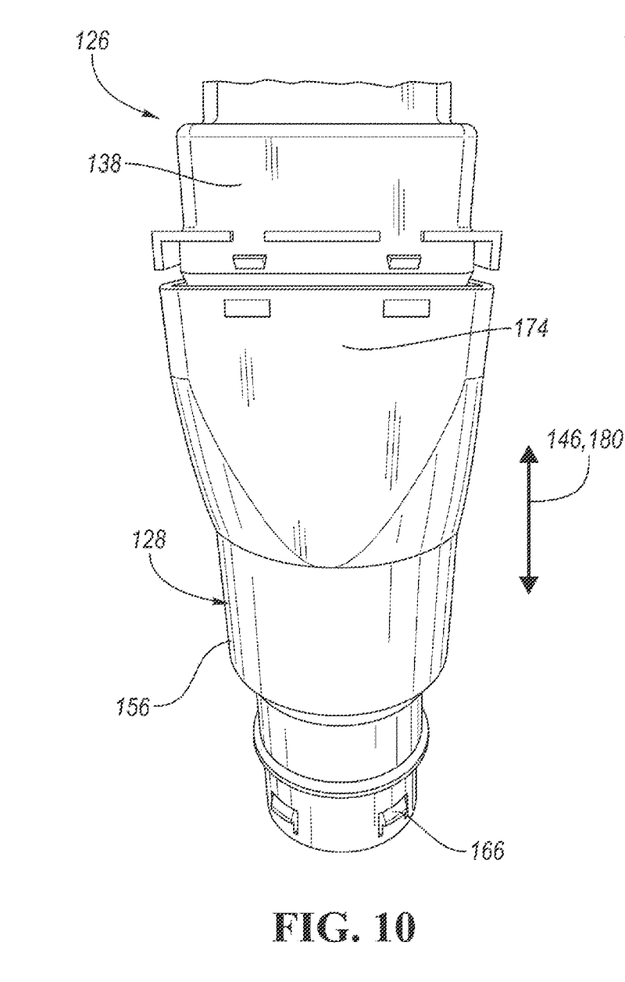
FIG. 10 is a back view of the alternative embodiment of the downspout drain filter.
Figure 14:
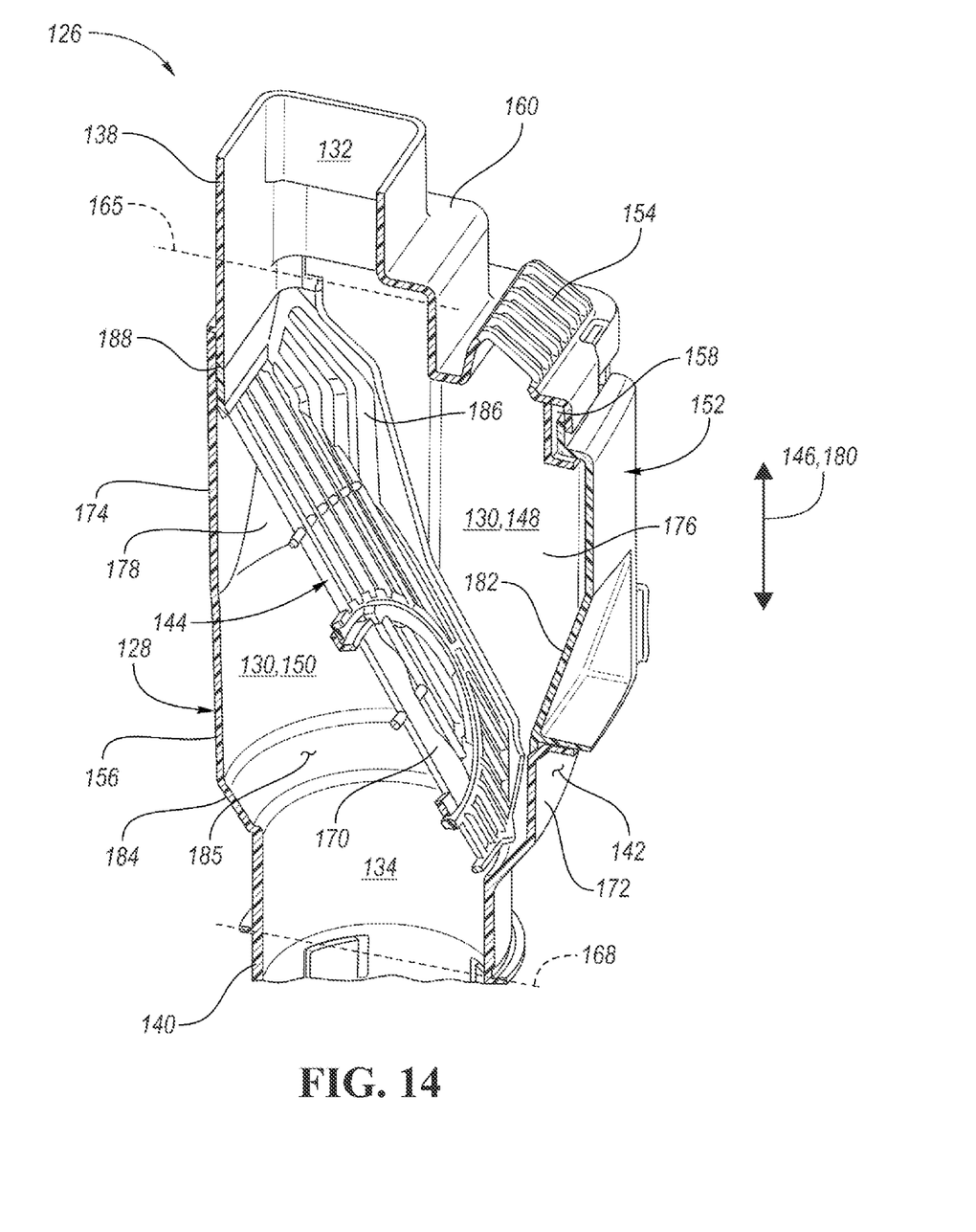
FIGS. 14 and 15 are isometric cross-sections side views of the alternative embodiment of the downspout drain filter taken along line 14-14 in FIG. 9.
Figure 15:
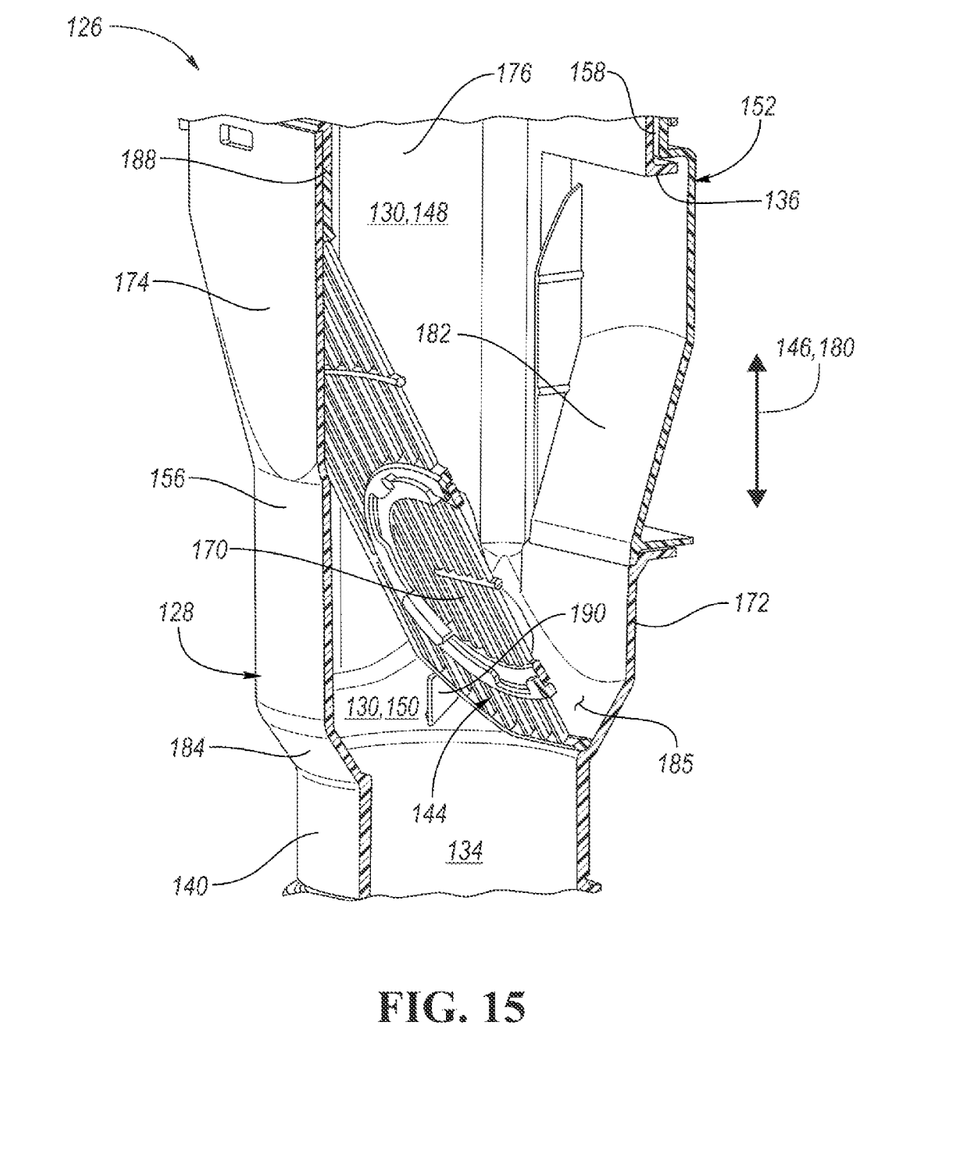

The top end 138 of the housing 128 may include a step 160. A cross-sectional area of the first opening 32 is decreased from a first value to a second value along the step 160 and in a direction that extends away from the internal cavity 130. For example, the portion of the first opening 132 where the cross-sectional area is equal to the first value may be sized to receive a four by three inch rectangular tube, conduit, or pipe, while the portion of the first opening 132 where the cross-sectional area is equal to the second value may be sized to receive a three by two inch rectangular tube, conduit, or pipe. In the event the larger-sized connection (e.g., the portion of the top end 138 where the cross-sectional area of the first opening 132 is equal to the second value) is required for connecting the housing 128 to the downspout 118, the smaller-sized connection (e.g., the portion of the top end 138 where the cross-sectional area of the first opening 132 is equal to the first value) may be cut off from the remainder of the housing 128. For example, the portion of the top end 138 that includes the smaller-sized connection may be cut off from the remainder of the housing 128 by cutting the housing 128 along dashed line 165.

The bottom end 140 of the housing 128 may be sized for connecting to a circular tube, conduit, or pipe. The bottom end 140 of the housing 128 may include clips, snaps, or tabs 166 to connect to a corrugated tube, conduit, or pipe. In the event the bottom end 140 is to be connected to a non-corrugated tube, conduit, or pipe, a portion of the bottom end 140 that includes the clips, snaps, or tabs 166 may be cut off from the remainder of the housing 128. For example, the portion of the bottom end 140 that includes the clips, snaps, or tabs 166 may be cut off from the remainder of the housing 128 by cutting the housing 128 along dashed line 168.

The filter plate 144 includes a removable central portion 170 that provides access to the lower chamber 150 from the upper chamber 148 when removed. The removeable central portion 170 may be removed so that a hose, jet, heat cable, etc. may be placed into the drainage conduit 20 that is positioned below the bottom end 140 of the housing 128. A hose or jet may be used to clean out the drainage conduit 20. A heat cable may be used to prevent water from freezing within the drainage conduit 20, particularly during the winter months, which could cause damage to the conduit.

Figure 11:
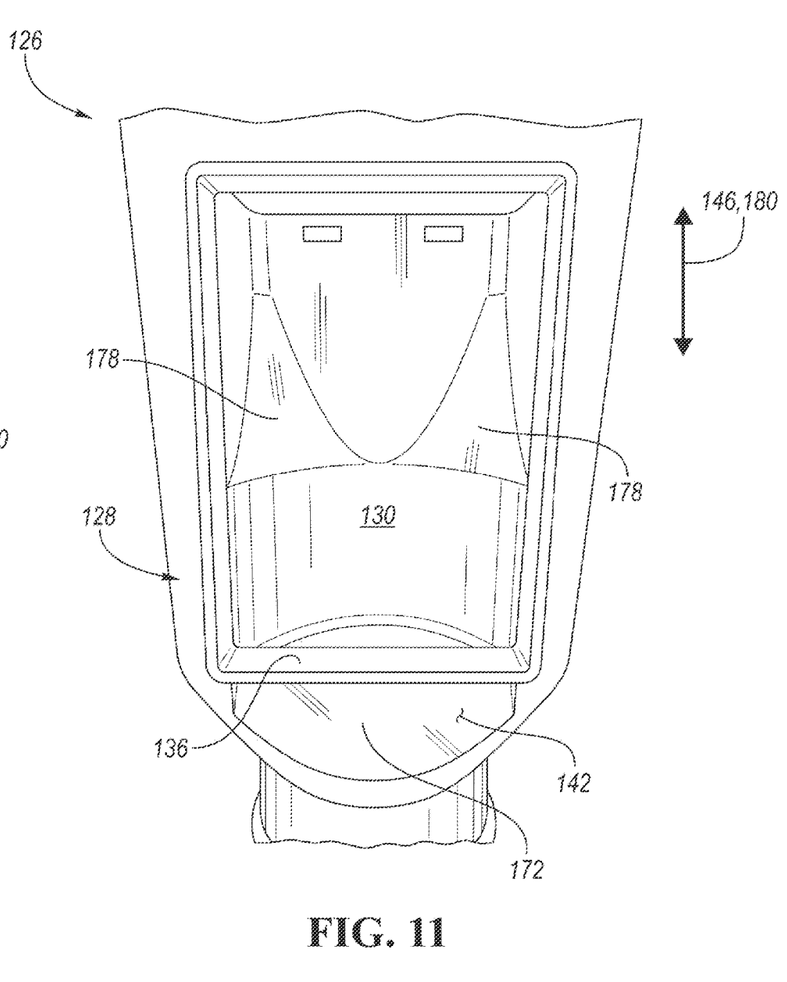
FIG. 11 is a front view of the alternative embodiment of the downspout drain filter with the access panel removed.
Figure 13:
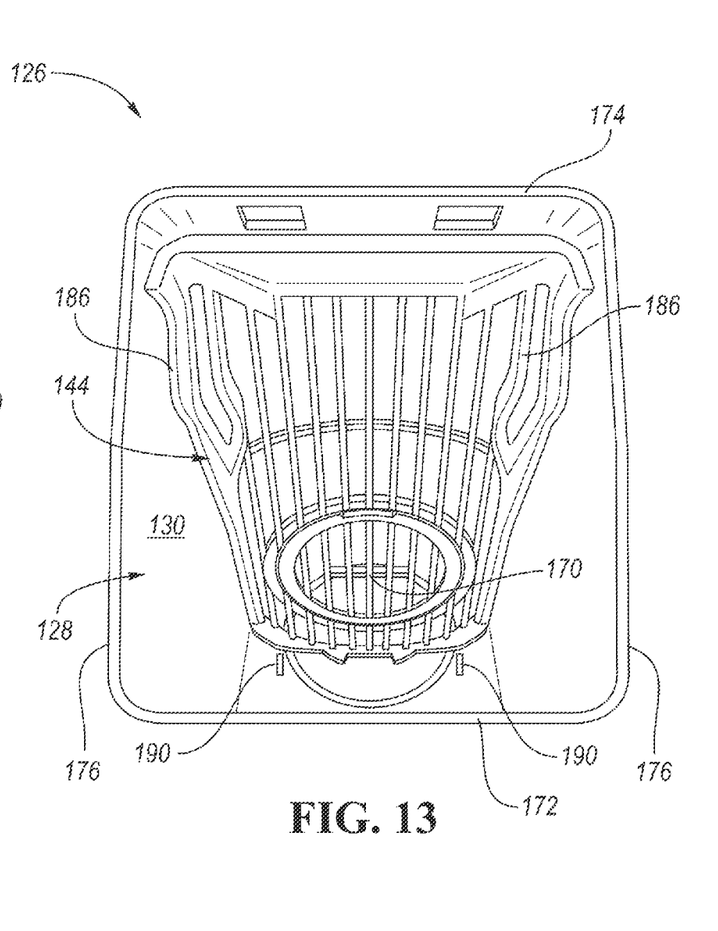
FIG. 13 is a top view of the alternative embodiment of the downspout drain filter with the filter plate disposed therein.

The removable central portion 170 of the filter plate 144 is configured to lock and unlock to and from a remainder of the filter plate 144 via rotation relative the remainder of the filter plate 144. The remainder of the filter plate 44 may be referred to as the main portion of the filter plate 144. The removable central portion 170 of the filter plate 144 includes a first set of tabs. The remainder of the filter plate includes a second set of tabs. The first set of tabs are configured to align with the second tabs to lock the removable central portion 170 of the filter plate 144 to the remainder of the filter plate 144. The remainder of the filter plate 144 defines slots. The first set of tabs are configured to align with the slots to unlock the removable central portion 170 of the filter plate 144 from the remainder of the filter plate. The filter plate 144 may include ribs that extending upward from an upper surface of the filter plate 144. The ribs are configured to separate debris from the upper surface of the filter plate 144 to facilitate flow of fluid or water through the filter plate 144. More specifically, the ribs are configured to lift the debris off of the upper surface of the filter plate 144 so the openings defined by the grating of the filter plate 144 are separated from the debris so that the fluid or water may flow through the openings.

The housing 128 also includes a front panel 172, a back panel 174, and a pair of opposing spaced-apart side panels 176. The front panel 172, back panel 174, and side panels 176 may collectively define the internal cavity 130. The pair of opposing spaced-apart side panels 176 may also be referred to as the first and second side panels. The front panel 172, back panel 174, and side panels 176 are disposed between the top end 138 and the bottom end 138. The housing 128 also includes at least one sloped surface 178 that extends into the internal cavity 130 and partially defines the internal cavity 130 such that the internal cavity tapers 130 in a direction 180 that extends from the top end 138 to the bottom end 140 of the housing 128 along the at least one sloped surface 178. Direction 180 may correspond to vertical direction 146. The at least one sloped surface 178 operates to channel the water that is flowing downward through the housing 128 toward the second opening 134 so that the water is directed toward the drainage conduit 20. The at least one sloped surface 178 also operates to channel water so that it is not directed to the access panel 152 in order to reduce or eliminate water leakage from the housing 128 via gaps between the access panel 152 and the housing 128 along the third opening 136.

Figure 12:
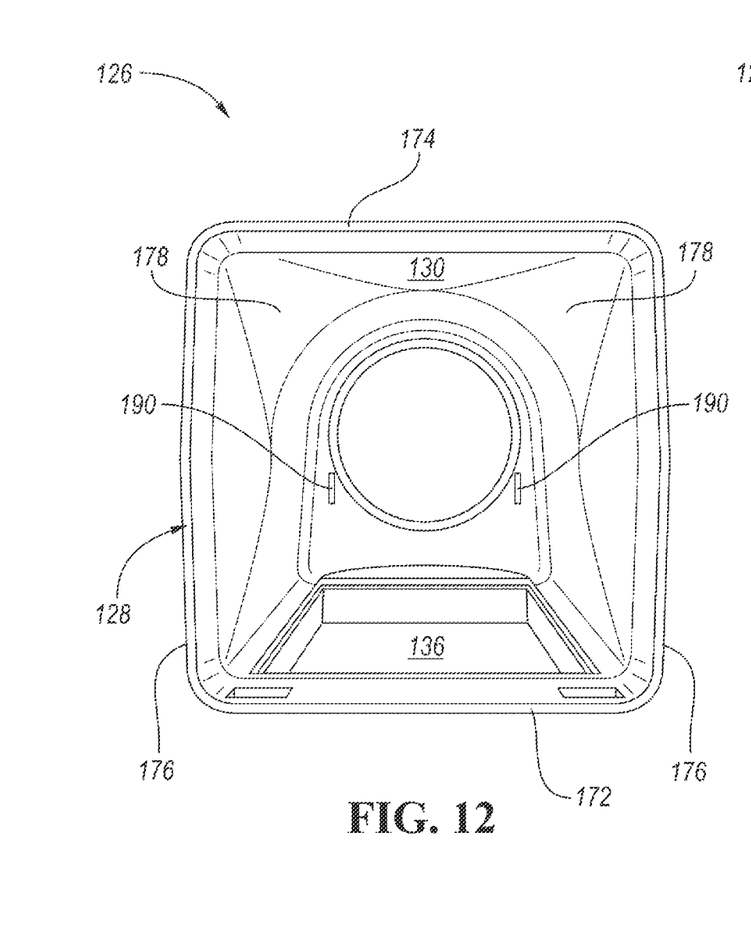
FIG. 12 is a top view of the alternative embodiment of the downspout drain filter with the access panel and the filter plate removed.

More specifically, the at least one sloped surface 178 may include two sloped surfaces. The two sloped surfaces may be referred to as first and second sloped surfaces. Each of the sloped surfaces 178 may extend between the back panel 174 and one of the side panels 176. Even more specifically, a first of the sloped surfaces 178 may extend between the back panel 174 and the first of the side panels 176 while a second of the sloped surfaces 178 may extend between the back panel 174 and the second of the side panels 176.

The front panel 172 may define the third opening 136, which may be referred to as an access opening. The access panel 152 is disposed over the third opening 136 and may be removed to provide access to the internal cavity 130 via the third opening so that debris may be removed from the internal cavity 130. The access panel 152 has a secondary sloped surface 182 that extends into the internal cavity 130 and partially defines the internal cavity 130 such that the internal cavity 130 tapers in the direction 180 that extends from the top end 138 to the bottom end 140 of the housing 128 along the secondary sloped surface 182. The secondary sloped surface 182 further operates to channel the water that is flowing downward through the housing 128 toward the second opening 134 so that the water is directed toward the drainage conduit 20. The secondary sloped surface 182 also operates to channel water away from the access panel 152 to reduce or eliminate water leakage from the housing 128 via gaps between the access panel 152 and the housing 128 along the third opening 136.

The housing 128 also includes a frustoconical section 184 that is disposed below the at least one sloped surface 178 and the secondary sloped surface 182. An internal surface 185 of the frustoconical section 184 is sloped or funnel-shaped, extends into the internal cavity 130, and partially defines the internal cavity 130 such that the internal cavity 130 further tapers in the direction 180 that extends from the top end 138 to the bottom end 140 of the housing 128 along the internal surface 185 of the frustoconical section 184. The internal surface 185 of the frustoconical section 184 further operates to channel the water that is flowing downward through the housing 128 toward the second opening 134 so that the water is directed toward the drainage conduit 20.

The filter plate 144 may be more specifically disposed within the internal cavity 130 between the front panel 172 and the back panel 174. The filter plate 144 may also be positioned at an angle within the internal cavity 130 such that an upper end of the filter plate 144 is adjacent to the back panel 174 while a lower end of the filter plate 144 is adjacent to the front panel 172. The filter plate 144 may include offset sections 186 that are disposed adjacent to and provide clearance for the sloped surfaces 178. More specifically, the filter plate 144 may include first and second offset sections 186 that are offset upward along the top surface of the filter plate 144, and are disposed adjacent to and provide clearance for the first and second sloped surfaces 178, respectively. The offset sections 186 may also be grated so debris may be collected along on the top sides of the offset sections 186 while fluid or water may flow through the openings defined by the grating along the offset sections 186 of the filter plate 144.

The top end 138 of the housing 128 may engage a top end of the filter plate 144 along an angled ledge 188. The housing 128 may further include tabs 190 that engage the bottom end of the filter plate 144. Collectively, the angled ledge 188 and the tabs 190 operate to retain the filter plate within the internal cavity 130.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A downspout drain filter comprising:
a housing defining (i) an internal cavity, (ii) an inlet to the internal cavity along a top of the housing, and (iii) an outlet from the internal cavity along a bottom of the housing, wherein the housing includes (a) front and back panels that are disposed between the top and bottom of the housing, (b) first and second side panels extending between the front and back panels, and (c) first and second sloped surfaces extending between the back panel and the first and second side panels, respectively, wherein the first and second sloped surfaces extend into the internal cavity such that the internal cavity tapers in the direction that extends from the top to the bottom of the housing along the first and second sloped surfaces; and
a filter plate (i) disposed within the internal cavity, (ii) dividing the internal cavity into an upper chamber and a lower chamber, (iii) configured to trap debris in the upper chamber from fluid flowing downward through the internal cavity, (iv) permeable such that the fluid flows from the upper chamber to the lower chamber, and (v) having a removable central portion that provides access to the lower chamber from the upper chamber when removed.

2. The downspout drain filter of claim 1, wherein the removable central portion of the filter plate is configured to lock and unlock to and from a remainder of the filter plate via rotation relative the remainder of the filter plate.

3. The downspout drain filter of claim 2, wherein (i) the removable central portion of the filter plate includes a first set of tabs, (ii) the remainder of the filter plate includes a second set of tabs, and (iii) the first set of tabs are configured to align with the second set of tabs to lock the removable central portion of the filter plate to the remainder of the filter plate.

4. The downspout drain filter of claim 3, wherein (i) the remainder of the filter plate defines slots and (ii) the first set of tabs are configured to align with the slots to unlock the removable central portion of the filter plate from the remainder of the filter plate.

5. The downspout drain filter of claim 1, wherein the filter plate includes ribs extending upward from an upper surface of the filter plate, and wherein the ribs are configured to separate the debris from the upper surface of the filter plate to facilitate flow of the fluid through the filter plate.

6. The downspout drain filter of claim 1, wherein (i) the front panel defines an access opening, (ii) a door is disposed over the access opening, and (iii) the door has a third sloped surface that extends into the internal cavity such that the internal cavity tapers in a direction that extends from the top to the bottom of the housing along the third sloped surface.

7. The downspout drain filter of claim 6, wherein the back panel is opposite of the front panel.

8. A downspout drain filter comprising:
a housing defining (i) an internal cavity, (ii) an inlet to the internal cavity along a top of the housing, and (iii) an outlet from the internal cavity along a bottom of the housing, wherein the housing includes (a) a back panel disposed between the top and bottom of the housing, (b) first and second side panels extending between the back panel and a front panel, and (c) first and second sloped surfaces extending between the back panel and the first and second side panels, respectively, wherein the first and second sloped surfaces extend into the internal cavity such that the internal cavity tapers in the direction that extends from the top to the bottom of the housing along the first and second sloped surfaces; and
a filter media (i) disposed within the internal cavity, (ii) dividing the internal cavity into an upper chamber and a lower chamber, and (iii) configured to trap debris in the upper chamber from fluid flowing downward through the internal cavity, and (iv) permeable such that the fluid flows from the upper chamber to the lower chamber, wherein the housing further defines an overflow opening along the top of the housing, and wherein the overflow opening is configured to direct the fluid out of the internal cavity in response to (a) the filter media becoming clogged and (b) the fluid filling the upper chamber.

9. The downspout drain filter of claim 8, wherein the overflow opening is orientated at an angle relative to a front face of the housing.

10. The downspout drain filter of claim 9, wherein the overflow opening is adjacent to and above the front face.

11. The downspout drain filter of claim 8, wherein the overflow opening is grated.

12. The downspout drain filter of claim 8, wherein the filter media includes a removable central portion that provides access to the lower chamber from the upper chamber when removed.

13. The downspout drain filter of claim 8, wherein (i) the front panel disposed between the top and bottom of the housing, (ii) the front panel defines an access opening, (iii) a door is disposed over the access opening, and (iv) the door has a third sloped surface that extends into the internal cavity such that the internal cavity tapers in a direction that extends from the top to the bottom of the housing along the third sloped surface.

14. The downspout drain filter of claim 13, wherein the back panel is opposite of the front panel.

* * * * *